United States Patent Office 2,821,822
Patented Feb. 4, 1958

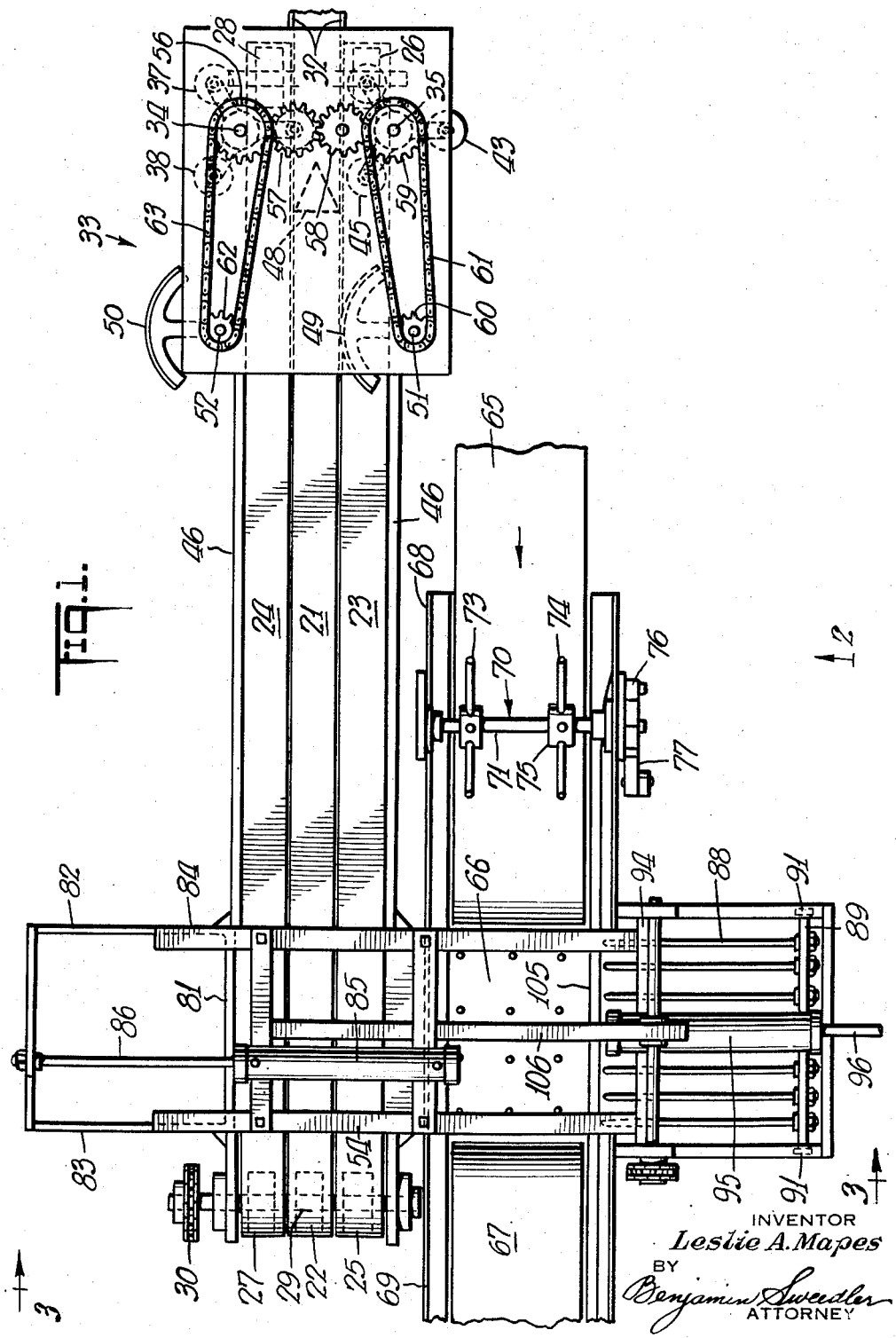

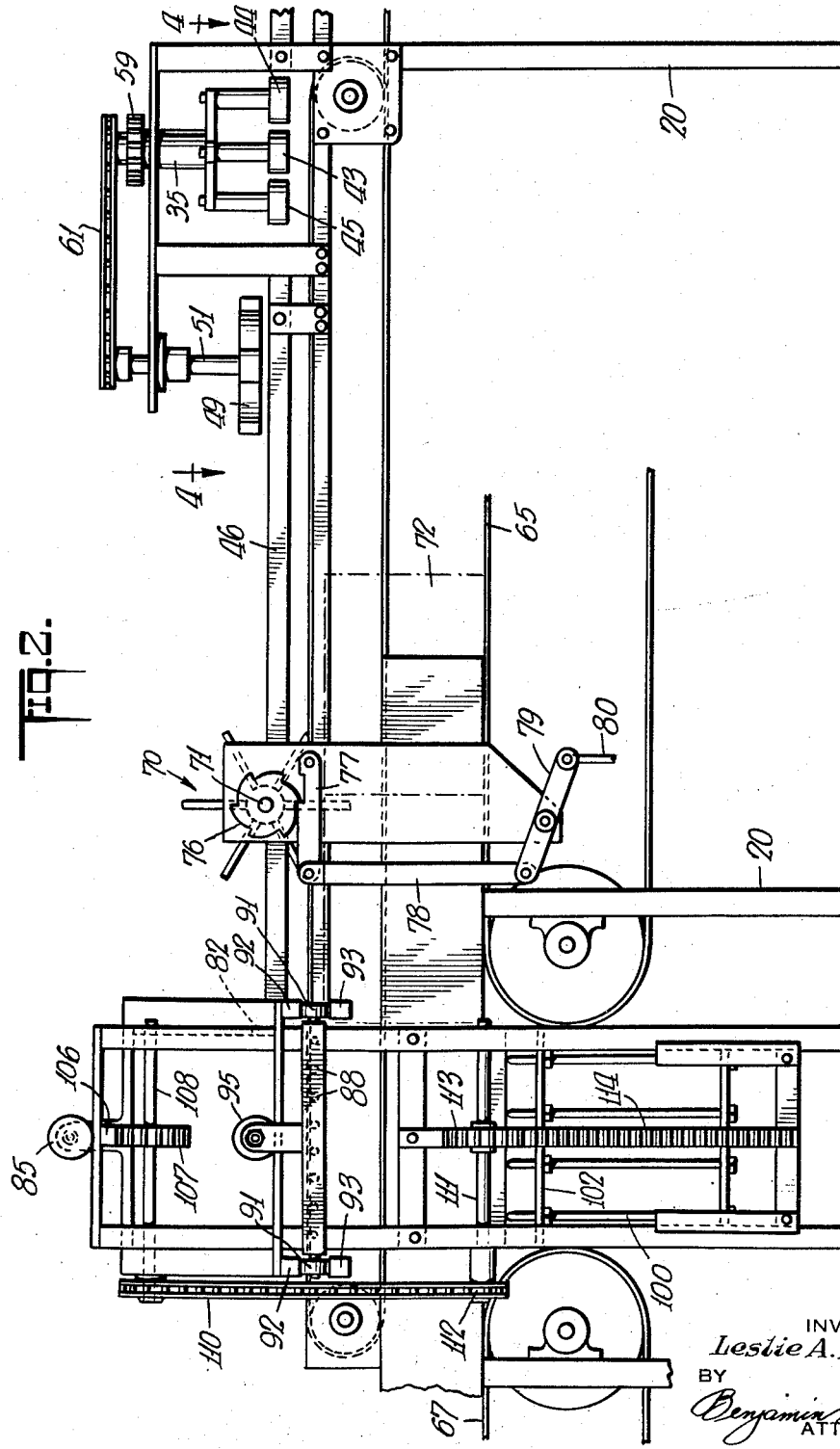

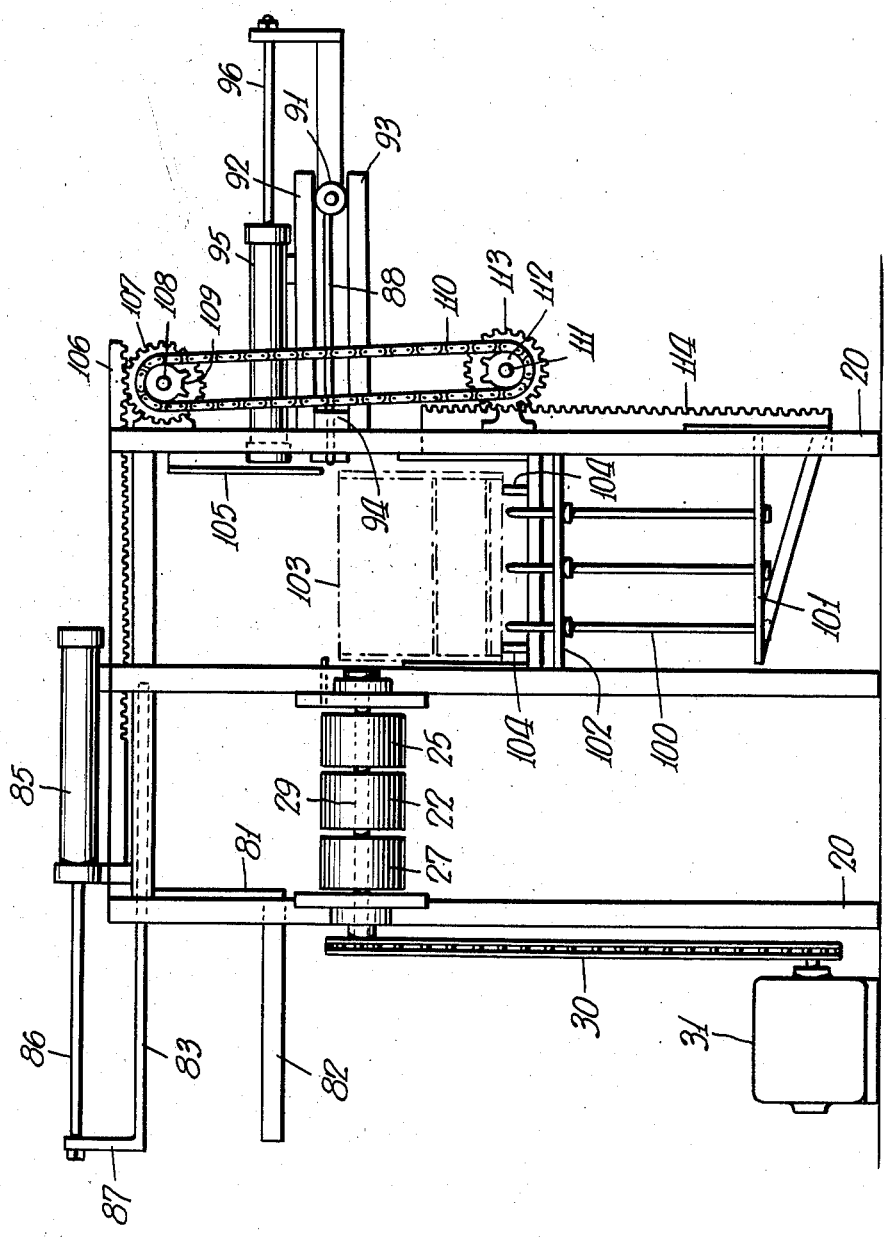

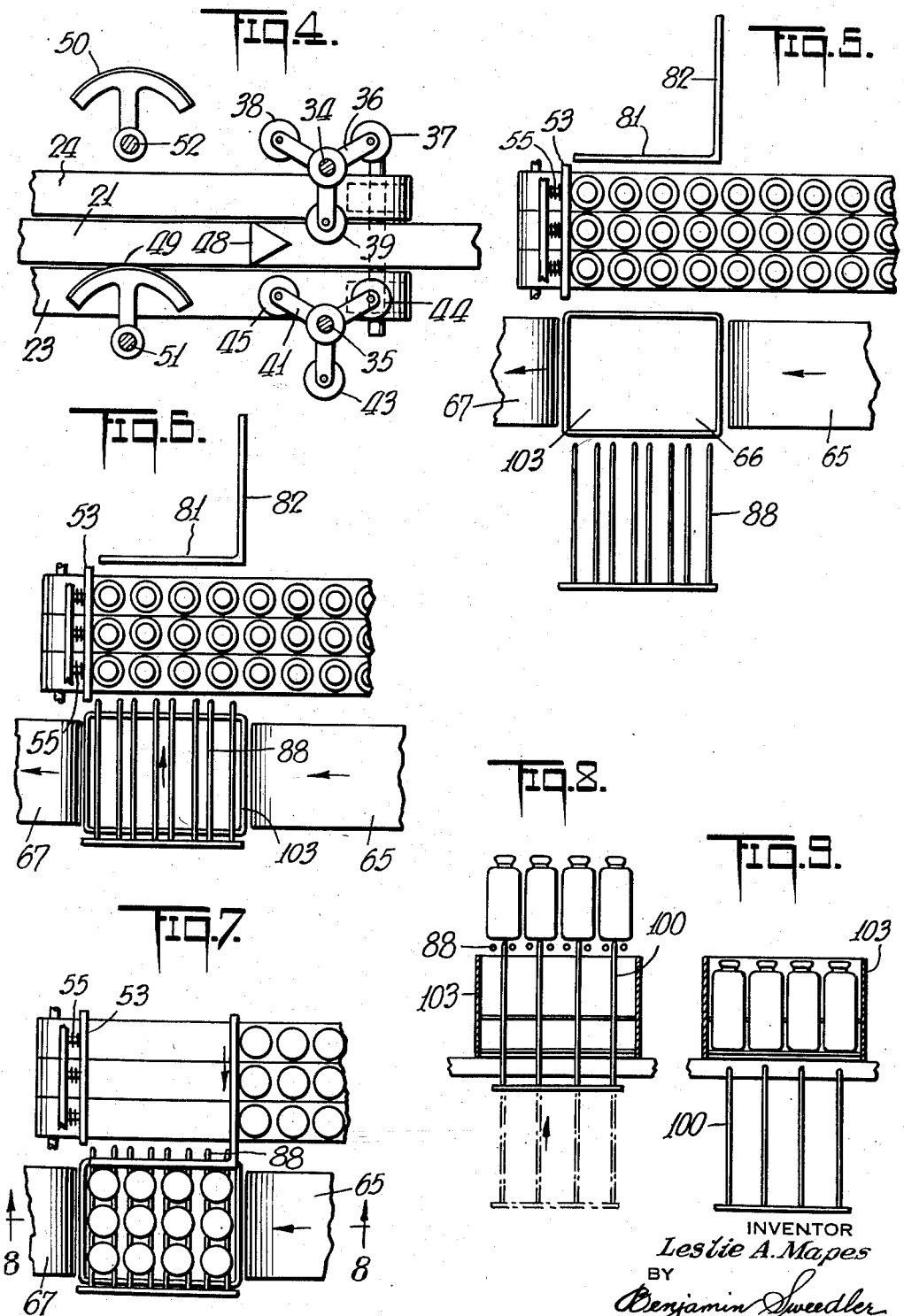

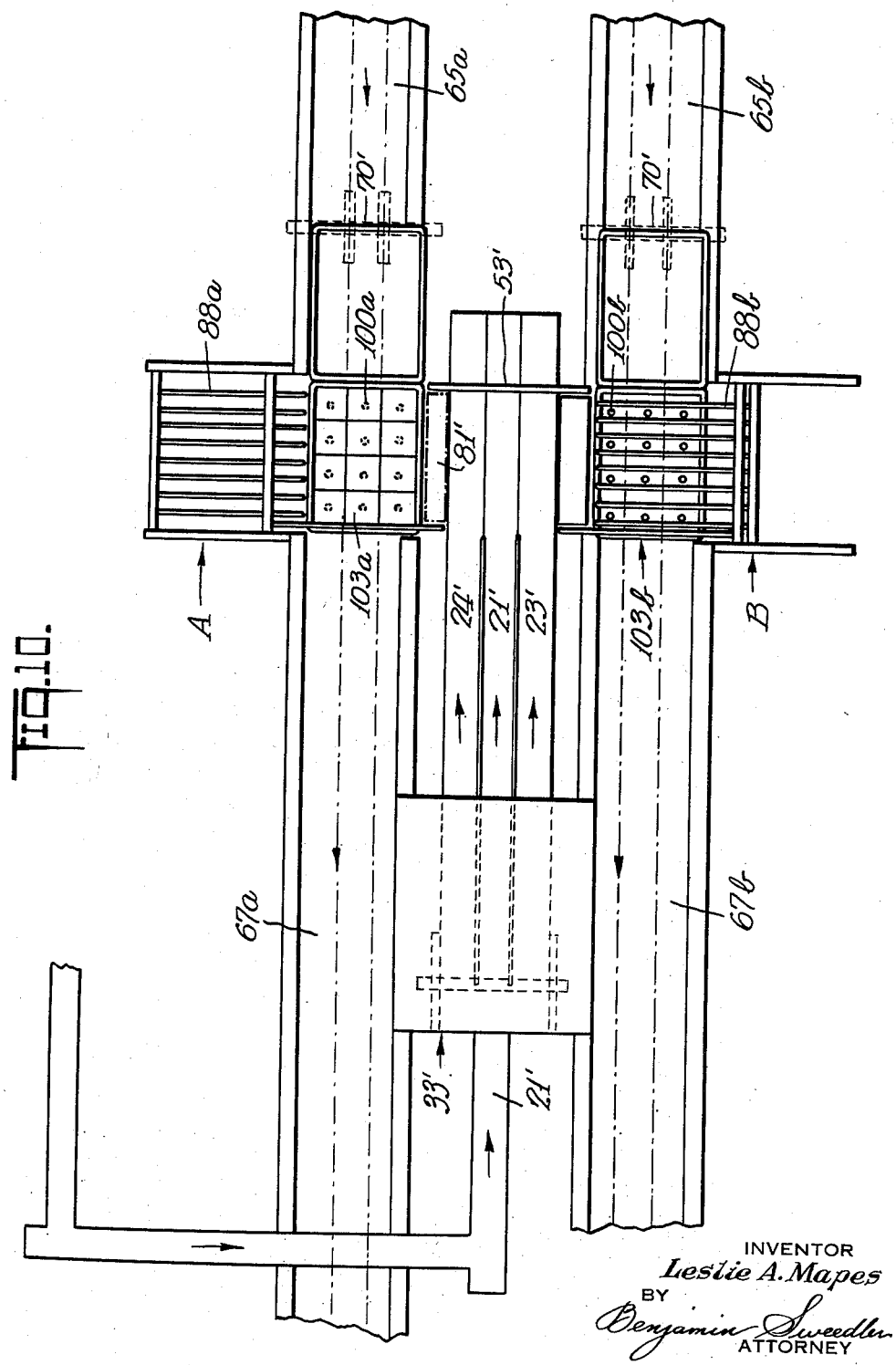

2,821,822

PROCESS AND APPARATUS FOR CASING GROUPS OF ARTICLES SUCH AS BOTTLES

Leslie A. Mapes, Palisade, N. J.

Application March 2, 1955, Serial No. 491,756

20 Claims. (Cl. 53—26)

This invention relates to apparatus for handling bottles, cartons, etc., which articles in the interests of conciseness will be hereinafter referred to as bottles. It also relates to a novel procedure of grouping bottles in groups of a desired number and depositing successive groups thus formed in cases, cartons or boxes, hereinafter referred to as cases. More particularly this invention relates to process and apparatus for handling milk bottles to place the filled and capped milk bottles in groups of a desired number, say 12, in upright position in cases.

It is among the objects of this invention to provide a process and apparatus for handling bottles which minimizes breakage of glass bottles, results in a saving of labor and time, and automatically places the bottles in cases each containing a desierd number of such bottles, say 12.

It is another object of this invention to provide such process and apparatus in which the bottles are so handled as to minimize moving parts engaging the bottles with consequent danger of damage thereto and disturbance of the position of the bottles within a desired group containing a number of rows of bottles.

Still another object of the present invention is to provide such process and apparatus in which the bottles are handled quickly, efficiently and expeditiously with consequent improvement in speed of operation in placing the bottles in the cases.

Other objects and advantages of this invention will be apparent from the following detailed description thereof.

In the preferred embodiments illustrated on the drawings, the invention is shown incorporated in milk bottle handling machines in which the bottle conveyors and the case conveyors travel in parallel directions and the description which follows will largely be confined to the present illustrated embodiments of the invention. It will be understood, however, that the novel features and improvements are susceptible of other applications, such, for example, as handling other containers than milk bottles including, for example, paper cartons now commonly employed as containers for milk and for other materials and apparatus in which the case conveyor and the bottle conveyors travel in a direction at an angle to each other. Hence, the scope of this invention is not confined to the embodiments herein described.

In accordance with this invention the apparatus comprises four main units, namely, (1) bottle feeding and grouping mechanism, (2) case conveyor mechanism for moving of empty cases into loading position and removing the loaded cases, (3) mechanism for feeding groups of bottles formed by the bottle feeding and grouping mechanism into position over the empty cases, and (4) mechanism for lowering the groups of bottles into the empty cases. In the interests of clarity and for purposes of relatively locating the parts of the apparatus, the location where the bottles are formed in the desired group of bottles arranged in rows each containing a predetermined number will be referred to hereinafter as the "group station," and the location of the group of bottles above the empty case will be referred to hereinafter as the "loading position."

In accordance with this invention the bottles are fed from the capping mechanism by a conveyor, one bottle in back of another, i. e., in a single row, to a bottle transfer mechanism which effects the arrangement of bottles in a desired number of parallel rows. In the embodiment of the invention shown in the drawings three such rows of bottles are formed. These three rows of bottles are moved by a conveyor so that the leading bottles abut a stop and accumulate in front of the stop at the "group station" to provide a group of 12 bottles consisting of three rows each of which contains 4 bottles. It will be understood of course that any desired group arrangement of bottles may be employed and the parts of the machine changed accordingly.

Disposed at a lower plane than the plane in which the bottles move is the case conveyor which positions a case laterally contiguous to the "group station" and just below the "loading position." In the latter, the bases of the bottles are supported just above the top of a case in the case loading position. The present invention is designed for use in connection with cases of the type now commonly employed having openings in the base. These openings are usually provided for a number of reasons among which may be mentioned they result in reduction of the weight of the case and also permit drainage of liquid resulting from ice which may be packed around the bottles, or due to a broken bottle, etc.

Slidable arms are positioned for movement in a horizontal plane, the same as that in which the base of the bottles rests when in the "group station." These arms are arranged to be moved repeatedly from a first position on the opposite side of the "loading position" from that at which the "group station" is disposed, to a second position bridging the space over the case conveyor and into substatial abutment with the "group station" and then back to the first position. A bottle transfer mechanism is arranged to move the group of bottles from the "group station" on to these arms when in position bridging the aforesaid space over the case conveyor.

A group of bottle supporting fingers, one for each bottle of the group, is mounted for reciprocatory motion through the open bottom of the case and is arranged to be moved to engage the bottles and elevate them slightly above the aforesaid sliding arms. In this way when the sliding arms are removed from beneath the bottles they exert no friction on the bottles, which might tend to displace the bottles from their group position. The sliding arms are adapted to be returned to their first position, leaving the bottles resting on the supporting fingers; these fingers are then lowered into the case conveyor to deposit the bottles therein. Further movement causes the supporting fingers to be withdrawn from the case conveyor permitting the loaded case to be removed and an empty case to be moved into case loading position.

All of the above movements take place automatically so that the bottles are efficiently grouped, the group moved over the case conveyor, lowered thereinto while positively supported, the loaded case removed, an empty case brought into position and these actions repeated as long as bottles and cases are supplied to the machine.

In the accompanying drawings forming a part of this specification and showing for purposes of exemplification preferred embodiments of this invention, without limiting the claimed invention of these embodiments, Figure 1 is a plan view of a preferred embodiment of this invention; the feed conveyor, the case conveyors and the extremity of the frame carrying the sliding arms are shown fragmentarily to permit showing the rest of the apparatus on a larger scale;

Figure 2 is a side elevational view of the machine of Figure 1, viewing it in the direction indicated by the arrow 2 on Figure 1;

Figure 3 is an end elevational view of the machine of Figure 1, viewing it in the direction indicated by the arrows 3 on Figure 1;

Figure 4 is a fragmentary detail plan view showing details of the bottle grouping mechanism and taken in a plane indicated by 4—4 on Figure 2;

Figure 5 is a schematic plan view showing the relative position of the "group station," empty case in loading position, and the sliding arms in their above mentioned first position to one side of the empty case;

Figure 6 is a similar schematic plan view, but showing the sliding arms in their second position, bridging the empty case;

Figure 7 is still another similar schematic view, showing the group of bottles in "loading position," and the stop in position to prevent bottles from entering the "group station."

Figure 8 is a diagrammatic vertical section showing the relative position of the empty case, and the bottles while supported on the vertical slidable fingers just before the bottles are lowered into the empty case;

Figure 9 is a view similar to Figure 8, but showing the position of the parts after the bottles have been lowered into the case; and Figure 10 is a plan view of a modification of the invention involving a duplex type machine in which one transfer mechanism for moving a group of bottles is employed in combination with two sets of case conveyors and two mechanisms for forming groups of bottles in two "loading positions" at opposite sides of one "group station."

*Bottle feeding and grouping mechanism*

In the drawings, 20 indicates a suitable frame which may be of channel bar construction and on which the parts of the apparatus are mounted. Since this framework may be of any suitable type it is believed further description thereof is unnecessary.

A conveyor 21 is provided for feeding the bottles to the machine. This conveyor 21 may be in the form of an endless belt, one end of which passes over a pulley 22 forming two horizontal passes on the upper of which the bottles rest. It will be understood that this conveyor may be constituted of flat rectangular plates pivoted to each other or may be of any other well known construction.

In the embodiment of the invention shown in the drawings conveyor 21 is the central or middle conveyor of a group of three and is flanked on its opposite sides by conveyors 23, 24. Conveyor 23 travels over pulleys 25, 26 and conveyor 24 over pulleys 27, 28. Pulleys 22, 25 and 27 are mounted on a shaft 29 which is driven through a chain drive 30 from any suitable source of power, such as motor 31.

Conveyor 21 at the extreme right hand end, viewing Figure 1, desirably is provided with guide rails 32, spaced apart a distance such as to permit a single row of bottles to move therebetween. This row of bottles is carried by conveyor 21 to transfer mechanism 33. This mechanism, as best shown in Figure 4, comprises two vertically extending rotatable shafts 34 and 35. Shaft 34 has fixed thereon three arms 36 spaced 120° apart. Rolls 37, 38 and 39, desirably of rubber or other material which will not damage the bottle, are carried by these arms. In like manner, shaft 35 has fixed thereon three arms 41 on which arms are mounted the bottle engaging rolls 43, 44 and 45. Rolls 43, 44 and 45 are positioned about the shaft 35 relative to the position of rolls 37, 38 and 39 on shaft 34, as shown in Figures 1 and 4, so that during each 60° of rotation a bottle is moved from the central conveyor 21 to a position on one or the other of conveyors 23, 24. The latter conveyors are provided with guide rails 46 to maintain the bottles thereon.

Cooperating with the bottle transfer rolls hereinabove described is a triangular shaped stop or abutment member 48 which insures movement of the bottles from the central conveyor 21 to the two lateral or side conveyors 23, 24 forming a spaced arrangement of the bottles as they are fed by the conveyors 23, 24 past rotating arcuate members 49 and 50. As shown in Figures 1 and 4, members 49 and 50 are positioned beyond the stop 48, in the direction of movement of the bottles. Arcuate member 49 is mounted for rotation on a vertical shaft 51 and member 50 on shaft 52. These two arcuate members are so positioned on their respective shafts that when member 49 is in the position shown in Figure 4, to move one bottle from conveyor 23 on to the central conveyor 21 the other member 50 is in the position shown in Figure 4. Members 49 and 50 are rotated at a speed so that they engage, respectively, every third bottle on conveyors 23 and 24; while member 49 engages a bottle, member 50 is in position out of contact with the bottles on conveyor 24. In this way every third bottle on conveyor 23 is moved therefrom on to the central conveyor 21, and similarly every third bottle on conveyor 24 is moved by arcuate member 50 from conveyor 24 on to the central conveyor 21, the bottles from conveyor 23 moved on to conveyor 21 alternate with those moved from conveyor 24 onto conveyor 21. Thus, three rows of bottles are produced on conveyors 21, 23 and 24 and are fed thereby into the bottle grouping position.

Stop plate 53 (Figures 5 and 6) provides an abutment against which the bottles accumulate; this stop plate is located just beneath the left hand top frame member 54 shown in Figure 1, and, hence, is masked from view by this frame member. Stop plate 53 desirably is in the form of a spring pressed plate against which the leading bottles of the three rows of bottles on conveyors 21, 23 and 24 abut. When the pressure of the bottles against plate 53 exceeds a desired predetermined pressure, determined, for example, by the tension exerted by springs 55 (Figures 5 and 6), a switch (not shown) in the power line leading to the motor 31 (Figure 3) is actuated to effect interruption of the power to motor 31. When this switch is thus actuated, operation of the filler mechanism and capping mechaism (not shown) is similarly interrupted. Hence, supply of capped and filled bottles to conveyor 21 is likewise interrupted. When the pressure on the plate 53 falls below this predetermined pressure, the switch mechanism hereinabove mentioned is actuated to close the circuits including the power lines leading to motor 31 and the actuating mechanism for filling and capping machine with consequent initiation of the supply of capped bottles to the inlet end of conveyor 21.

The capped and filled bottles rest on the upper passes of the conveyors 21, 23 and 24 and are carried thereby so that the leading bottles contact plate 53 of the stop mechanism. The bottles thus accumulate in three parallel rows against the plate 53. In the case of one quart milk bottles, an arrangement of three rows of 4 bottles represents a desirable grouping of bottles to fill a 12 bottle case; most cases now available are compartmented to receive such grouping. As noted above, the invention is not limited to such grouping of the bottles; by employing additional conveyors or by suitable modification of the transfer mechanism 33, other desired groupings of bottles can be produced.

Actuation of the transfer mechanism 33 is effected by the forward motion of the bottles fed by conveyor 21. The two shafts 34 and 35 are interconnected for rotation in opposite directions by a gear 56 keyed to shaft 34 and meshing with a gear 57 which in turn meshes with a gear 58 meshing with a gear 59 keyed to shaft 35. Gears 57 and 58 are mounted on suitable stub shafts. The arcuate members 49 and 50 are driven from the above described drive for the bottle transfer rolls. Thus, shaft 51 has keyed thereon a sprocket 60 which is driven by a chain 61 from a sprocket on shaft 35. Similarly, shaft 52 has keyed thereon a sprocket 62 which is driven by chain 63 from shaft 34.

*Case conveyor mechanism for moving an empty case into loading position and removing the loaded case*

In the embodiment of the invention shown in the drawings, the case conveyors comprise two conveyors, one, 65, for feeding the empty cases to case loading position 66, and the other, 67, for removing the filled case from the case loading position 66. Conveyors 65 and 67 may be of any suitable type, such as conventional belt conveyors. Conveyor 65 has associated therewith side or lateral guide rails 68 which properly align the empty case, so that it will enter the case loading position 66 with the compartments therein properly positioned relative to the group of 12 bottles to be fed thereto. Conveyor 67 has associated therewith lateral or side guide rails 69 which guide the filled cases as they are removed. Since these conveyors may be of any well known type, it is believed further description thereof is unnecessary, except to note that the upper pass of these conveyors, as best shown in Figure 2, are located beneath the conveyors 21, 23, 24, the upper pass of these conveyors moves in a direction parallel to the direction of movement of the bottle feeding conveyors and the conveyors 65, 67 and the bottle loading position 66 are so positioned that the empty case is brought into bottle loading position 66 with its top disposed just below the bases of the bottles in the "group station."

Conveyor 65 is provided with control mechanism 70 which controls the feed of the empty case into the bottle loading position. This control mechanism, as shown in Figures 1 and 2, involves a rotatable shaft 71 suitably mounted in bearings above cases 72 on conveyor 65. Fixed to this rotatable shaft 71 are two sets of stop fingers 73 and 74. Each set desirably comprises five fingers spaced approximately 72° apart and carried by a hub 75 keyed to the shaft 71. By employing two sets of fingers the pressure exerted on the fingers is minimized and breakage of the fingers is prevented. When the fingers are disposed within the case they prevent movement of the case to bottle loading position.

The shaft 71 has keyed thereon a ratchet 76 which is actuated by pawl 77, one end of which is pivoted to a link 78 (Figure 2) which in turn is actuated by a pivoted link 79 through an arm 80. Arm 80 may be actuated by the operator to effect movement of the control fingers 73, 74 to permit an empty case to be moved into the case loading position 66. Preferably, however, this control mechanism is actuated pneumatically from one of the pressure cylinders hereinafter described in timed relation with the mechanism for effecting lowering of the bottles into the case so that after the case has been loaded with the group of bottles, the control mechanism is actuated to permit conveyor 65 to move an empty case into case loading position, thus forcing the filled case on to the conveyor 67, which effects the removal of the filled case from the machine.

*Mechanism for feeding a group of bottles from "group station" to "loading position"*

This mechanism comprises a pusher bar 81 (Figures 1, 5, 6 and 7) having at right angles thereto a retaining plate 82, which, when the pusher bar 81 moves from the position shown in Figures 5 and 6 to that shown in Figure 7, acts as a stop to prevent feed of bottles into the "group station," as is clearly shown in Figure 7. Pusher bar 81 and retaining plate 82 are carried by a frame 83 reciprocable in a horizontal plane just above the conveyors 21, 23 and 24. This frame in its reciprocatory motion is guided by suitable guides or U-shaped channels indicated generally by the reference character 84. Reciprocatory motion of the frame carrying the pusher bar 81 and retaining plate 82 is effected by a pneumatic cylinder 85 suitably mounted on the structural frame-work 20, piston stem 86 of which is connected with an arm 87 integral with or suitably secured to the frame 83.

In Figures 1, 3, 5 and 6, the pusher bar 81 and retaining plate 82 are shown in the position they occupy while the bottles are being grouped at the "group station." In this position, it will be noted from Figures 1, 5 and 6, the bottles are free to accumulate in front of the stop 53 to form the desired group. Upon the formation of the group of bottles, actuation of the pressure cylinder 85 to cause the piston therein to move from left to right, viewing Figure 3, effects movement of the pusher bar 81 from left to right, viewing Figure 3. A group of bottles is thus moved from the "group station" to the "loading position." As pusher arm 81 effects such movement of the group of bottles the retaining plate 82 is brought into position to act as a stop preventing entry of bottles into the "group station" while pusher bar 81 is effecting movement of the group of bottles to the "loading position."

Just prior to the movement of the group of bottles to the "loading position," as hereinabove described, sliding arms 88 are moved from the position shown in Figures 1 and 5 to a position bridging the space above the empty case and providing a support for the bottles during movement into and while in "loading position." Arms 88 are carried by a frame 89 (Figure 1) having rolls 91 at the ends thereof mounted for movement between upper and lower guide bars 92, 93 (Figure 2). At the forward end of the guide bars 92, 93 guide or bearing members 94 are provided for supporting and guiding the arms during their horizontal reciprocatory motion. Such motion is imparted to the arms by a pressure cylinder 95 suitably mounted on the framework of the machine, piston stem 96 of which is connected to the frame 91 to impart reciprocatory motion thereto.

*Mechanism for lowering the group of bottles into the empty case*

This mechanism comprises vertical reciprocable fingers 100 carried by a suitable frame 101. This frame has one finger 100 for each bottle of the group, the fingers 100 being arranged in three rows each containing 4 fingers corresponding to the grouping of the bottles in the loading position. Desirably, the top of each finger may be tipped with rubber or other flexible material to minimize damage to the bottles. The fingers are guided in their reciprocatory motion by suitable guides 102 in the nature of bearing members through which the fingers reciprocate. As shown in Figure 3, frame 101 carrying the fingers 100, when in its lowermost position, disposes the top of the fingers below empty case 103, which, when in loading position rests on suitable rails 104 (Figure 3). The cases are of the type having their bases completely open or provided with openings through which the fingers 100 move.

In the elevated position of fingers 100 the bases of the bottles are engaged and elevated slightly above the arms 88 so that the weight of the bottles rests on the fingers and not on the arms 88. In this way when the arms 88 are retracted by actuation of pneumatic cylinder 95 movement of the arms does not disturb the grouping of the bottles in the "loading position." In the latter position the group of bottles is guided and maintained properly grouped not only by the pusher bar 81, but also by plates 105 (Figure 1) which define the rectangular outline of the "loading position."

The frame 101 carrying the loading fingers is moved up and down, in the embodiment of the invention shown in the drawings, by the pneumatic cylinder 85 which, as above described, effects actuation of the pusher bar 81. Frame 83 on which pusher bar 81 is fixed has secured thereto a rack 106 (Figure 3) which effects rotation of a pinion 107 on shaft 108 rotating in suitable bearings secured to frame 20. A sprocket 109 on shaft 107 drives a chain 110, which in turn drives a shaft 111 through sprocket 112 thereon. Shaft 111 has thereon a pinion 113 meshing with a rack 114 secured to frame 101. In this way pusher bar 81 and fingers 100 are actuated in timed realtion. As the pusher bar is moved from left to right, viewing Figure 3, to move the group of bottles from the "group station" to the "loading position" the fingers 100 are simultaneously elevated.

Just prior to the movement of the pusher bar, the pneumatic cylinder 95 is actuated to move the arms 88 in place to provide a support for the bottles over the empty case 103. The bases of the bottles are not engaged by the fingers 100 until the last row of bottles has been moved into the "loading position"; the very end of the stroke of the piston stem 86 in a direction from left to right, viewing Figure 3, serves to move the forward row of bottles against stop plate 105 and elevate the bottles slightly above the arms 88, as shown in Figure 8. Thereafter the arms 88 are withdrawn to their first position, shown in Figures 5 and 6. Upon actuation of cylinder 85 to retract the pusher bar 81 to the position shown in Figures 5 and 6, the fingers 100 and the bottles resting theron are lowered into the case. The compartments in the case guide the bottles as they descend thereinto. Upon completion of this stroke of piston stem 86, the fingers 100 are positioned free of the case thereabove (see Figures 3 and 9), so that the filled case is in position to be moved onto conveyor 67 which removes it from the machine.

It will be understood that the pressure lines supplying pressure fluid to cylinders 85 and 95 may be controlled by an operator to effect the above described movements of pusher arm 81, arms 88 and fingers 100 in desired timed sequence. Alternatively, they may be controlled from a central control station which regulates the supply and discharge of pressure fluid to these cylinders so that the parts are actuated in the above described timed sequence. The control of the feed of the empty cases to "loading position," as well as the drive for the conveyors, may be controlled from this central station so that the operation of the machine is completely automatic requiring a minimum of attention.

*Duplex machine of Figure 10*

Parts of this machine which are similar to those of the machine hereinabove described but involve a duplication thereof are indicated by corresponding reference characters followed by the letter *a* or *b*. Parts which have not been duplicated are indicated by the same reference character followed by a prime sign.

In this machine conveyor 21' feeds a single row of bottles to a transfer mechanism 33', which, as hereinabove described, forms three rows of bottles on conveyors 21', 23' and 24'. These three rows are moved so that the leading bottles of each row abut a stop 53' forming three rows of bottles each row containing 4 bottles or other desired number in the "group station" disposed immediately in front of stop 53'.

Disposed on opposite sides of the "group station" are two case loaders A and B. Case loader A comprises the horizontally reciprocable arms 88a and the vertically reciprocable bottle supporting fingers 100a. Case loader B comprises the horizontally reciprocable arms 88b and the vertically reciprocable bottle supporting fingers 100b. Cooperating with both loaders A and B is a single pusher arm 81' which may be intermittently reciprocated back and forth from the dotted to the full line positions shown in the drawing and vice versa. In the construction of Figure 10 a bottle retaining arm corresponding to 82 of Figure 5 is not employed. When pusher arm 81' is in the full line position shown in Figure 10, the three rows of bottles accumulate in front of the stop 53' to the left of the pusher arm. As the pusher arm is moved to the dotted line position it pushes the group of bottles formed on the conveyors on to arms 88a, which have been moved to bridge the space over the empty carton 103a, so that the group of bottles is transferred on to arms 88a over the empty carton. It will be understood the arms 88a are moved in timed relation so that they are properly positioned to receive the group of bottles before the latter is moved by the pusher 81', as hereinabove described. Simultaneously with the movement of the pusher 81', fingers 100a are raised and just before the group of bottles reaches the end of its movement over the empty carton 103a the fingers 100a engage the bases of the bottles and elevate them slightly above the arms 88a.

When the pusher arm 81' reaches its dotted line position the "group station" is free to receive the next group of bottles, the leading bottles of the three rows of bottles thus formed moving into abutment with the stop 53'. Movement of the pusher 81' from the dotted line to the full line position effects the transfer of this group of bottles on to horizontally reciprocating arms 88b, which are in a position shown in Figure 10 bridging the space above empty carton 103b. Similarly, the vertically reciprocable fingers 100b move upwardly to support the bottles, and, when the fingers 88b are moved to the dotted line position shown in the drawings, these fingers 100b descend to lower the bottles into the case 103b. The cases thus filled are removed by conveyors 67a and 67b, respectively.

Thus, in the apparatus of Figure 10, one pusher is used to alternately move groups of bottles to the loading stations A and B. These stations are operated in timed sequence with the operation of the pusher, providing the necessary time interval for the accumulation of a group of bottles in the "group station," so that, while one group of bottles is being lowered into a case and the case thus filled at one of the loading stations, say station A, the horizontally reciprocable supporting arms at the other station are moved into position over the empty case and movement of a second group of bottles on to these arms is initiated.

In the process of handling bottles in accordance with this invention the bottles are first grouped at a "group station," then the group moved from the "group station" on to a suitable bridge over an empty case, then the bases of the bottles are engaged and the bottles elevated so they no longer rest on the bridge, thereafter the bridge is withdrawn and the bottles are lowered while supported from their bases into the case. Thus, in this process the weight of the bottles while lowered into the case is carried by the vertically reciprocable fingers which engage the bases of the bottles. This enables retraction of the horizontally reciprocable bridge arms without disturbing the grouping of the bottles and minimizes damage including breakage of glass bottles.

It will be understood that the apparatus herein disclosed represents a preferred form of apparatus for practicing this process and that the process may be carried out in other apparatus which need not be automatic, although for reasons of economy from the standpoint of labor and saving of time automatic apparatus, such as herein disclosed, is preferred. Thus, for example, instead of actuating the vertically reciprocable fingers pneumatically, as herein described, other drives therefor may be employed, and instead of a plurality of horizontally reciprocable bars corresponding to 88, 88a or 88b, a single reciprocatory supporting member may be used provided with aligned openings through which the bottle supporting fingers may pass.

It will be noted the present invention provides a process and apparatus for handling bottles which results in a saving of labor and time and, in the preferred embodiment, automatically places the bottles in cases each containing a desired number of bottles. Further, in the case of glass bottles the present invention minimizes breakage.

Since certain changes in carrying out the above process and in the bottle handling machine set forth, which embody the invention, may be made without departing from its scope, it is intended that all matter contained in the above description or shown in the accompanying drawings shall be interpreted as illustrative and not in a limiting sense. Thus the apparatus herein disclosed may be used not only for placing bottles in empty cases, but with minor modifications may be employed to unload bottles from filled cases, e. g., filled cases may be moved to bottle loading position, the vertically movable fingers actuated to raise the bottles, the horizontally reciprocable arms then actuated to provide a support for the bottles resting on the fingers, the fingers lowered, leaving the bottles resting on the arms, and the pusher actuated to move the bottles from the arms onto a conveyor which moves the group of bottles say to a bottle washing machine or to other disposal point.

What is claimed is:

1. A process for disposing articles in a case, which process comprises forming a group of said articles, moving said group on to a movable bridge disposed above the mouth of said case, projecting a support for said group through the base of said case into engagement with the base of said articles, withdrawing said bridge from above the open mouth of said case and then lowering the group of articles into said case while resting on said support.

2. A process for disposing articles in a case, which process comprises forming a group of said articles, moving said group on to a movable bridge disposed above the mouth of said case, projecting a support for said group through the base of said case into engagement with the base of said articles and beyond thus elevating said articles above said bridge, withdrawing said bridge from above the open mouth of said case while the articles are thus elevated and then lowering the group of articles into said case while resting on said support.

3. A process of disposing articles in a case, which process comprises forming a group of said articles, moving said group laterally on to a series of spaced movable arms disposed above the mouth of said case, projecting a plurality of article supporting fingers there being one such finger for each article of said group through the base of said case into engagement with the base of said articles and beyond thus elevating said articles above said arms, withdrawing said arms from above the open mouth of said case while the articles are thus elevated and then lowering the group of articles into said case while resting on said fingers.

4. A process of disposing bottles in groups of a predetermined number in a compartmented case each compartment of which is adapted to receive a single bottle, which process comprises feeding a single row of said bottles, forming from said single row a plurality of rows of bottles, feeding the plurality of rows so that the leading bottle of each row engages a stop thus producing a group of bottles containing a predetermined number of bottles in each row with the bottles in each row substantially abutting and with contiguous rows in closely spaced relation, providing an empty case laterally contiguous to and below said group of bottles, moving a bridging member in a substantially horizontal plane the same as that in which the base of the bottles of said group rests into position above the empty case and to receive said group of bottles, moving the said group of bottles on to said bridging member, moving a supporting member through the base of the empty case into engagement with the bases of the bottles, removing the said bridging member from above the mouth of the empty case and lowering the supporting member to place the group of bottles in said case with one bottle in each compartment in said case.

5. A process of disposing bottles in groups of a predetermined number in a compartmented case each compartment of which is adapted to receive a single bottle, which process comprises feeding a single row of said bottles, forming from said single row a plurality of rows of bottles, feeding the plurality of rows so that the leading bottle of each row engages a stop thus producing a group of bottles containing a predetermined number of bottles in each row with the bottles in each row substantially abutting and with contiguous rows in closely spaced relation, providing an empty case laterally contiguous to and below said group of bottles, moving a bridging member in a substantially horizontal plane the same as that in which the base of the bottles of said group rests into position above the empty case and to receive said group of bottles, moving the said group of bottles on to said bridging member, moving a plurality of supporting fingers equal in number to the number of bottles in said group through the base of the empty case and the compartments therein into engagement with the bases of the bottles of said group and beyond to elevate said group above said bridging member, removing the said bridging member from above the mouth of the empty case while the group of bottles are thus elevated and lowering the supporting member to place said group of bottles in said case with one bottle in each compartment in said case.

6. A process of disposing bottles in groups of twelve in a compartmented case containing twelve compartments, which process comprises feeding a single row of said bottles, forming from said single row three rows of bottles, feeding the three rows so that the leading bottle of each row engages a stop thus producing a group of bottles containing four bottles in each row with the bottles in each row substantially abutting and with contiguous rows in closely spaced relation, providing an empty case laterally contiguous to and below said group of bottles, moving a bridging member in a substantially horizontal plane the same as that in which the base of the bottles of said group rests into position above the empty case and to receive said group of bottles, moving the said group of bottles on to said bridging member, moving twelve supporting fingers through the base of the empty case and through the compartments therein with each finger passing through a different compartment into engagement with the bases of the bottles and beyond to elevate them above said bridging member, removing the said bridging member from above the mouth of the empty case while the bottles are thus elevated and lowering the supporting member to place the group of bottles in said case with one bottle in each compartment in said case.

7. Article handling apparatus comprising, in combination, means forming a group of articles in a fixed location, means for supporting an empty case in position laterally contiguous to said location with the mouth of said case below said location, bridging means movable over the top of said empty case and removable away from the top of the case, means for moving said group on to said bridging means, and supporting means vertically reciprocable through the base of said case to support the base of said articles and adapted to be lowered to lower the articles into said case, said bridging means having spaces therein through which the supporting means pass to engage the bases of said articles.

8. Article handling apparatus comprising, in combination, means forming a group of articles in a fixed location, means for supporting an empty case in position laterally contiguous to said location with the mouth of said case below said location, bridging means movable over the top of said empty case, means for moving said group on to said bridging means, supporting means movable up through the base of said case and through said bridging means to support the base of said articles and elevate them above said bridging means, means for withdrawing said bridging means from above the top of said case and means for lowering said supporting means to lower the articles into said case.

9. Bottle handling apparatus for placing a group of bottles in a case comprising, in combination, means for feeding said bottles in a plurality of rows to form a group of said bottles, means for feeding an empty case to a position laterally contiguous to said group, the mouth of the case being disposed below the base of the bottles of said group, horizontally reciprocable means movable over the mouth of said empty case into position to receive the said group of bottles and support the said group of bottles above the empty case and also movable to a position at one side of said mouth, vertically reciprocable bottle supporting fingers movable through the base of said case into engagement with the base of said group of bottles there being one such finger for each bottle of the group and also movable downwardly to lower the group of bottles into said case.

10. Bottle handling apparatus for placing a group of bottles in a case comprising, in combination, means for feeding said bottles in a plurality of rows to form a group of said bottles, means for feeding an empty case to a position laterally contiguous to said group, the mouth of the case being disposed below the base of the bottles of said group, horizontally reciprocable bridging means movable over the mouth of said empty case into position to receive the said group of bottles and support the said group of bottles above the empty case and also movable to a position at one side of said mouth, vertically reciprocable bottle supporting fingers movable through the base of said case into engagement with the base of said group of bottles there being one such finger for each bottle of the group and means for moving said supporting fingers to elevate said bottles above said bridging means and for lowering the group of bottles into said case.

11. Apparatus for forming a group of bottles containing a predetermined number of said bottles and placing said group into a compartmented case having an open base, comprising, in combination, means for feeding a single row of bottles, means for forming said row of bottles into a plurality of rows, a stop, means for feeding the plurality of rows so that the leading bottle of each row engages said stop thus producing a group of bottles containing a predetermined number of bottles in each row at a location near the terminal end of said bottle feeding means, means for feeding empty cases one by one into a position laterally contiguous to said location with the top of each case below the base of said group of bottles at said location, a bridging member movable in a substantially horizontal plane, the same as that in which the base of the bottles rests, over an empty case in said position, means for moving said bridging member over the mouth of an empty case, means for moving a group of bottles from said location on to said bridging member, vertically reciprocable bottle supporting fingers one for each bottle of said group movable through the base of the empty case into engagement with the base of said bottles of said group to elevate them above said bridging member, means for retracting the bridging member from above the mouth of the empty case leaving the group of bottles supported on said bottle supporting fingers, and means for lowering said fingers to place the bottles in the case with one bottle in each compartment.

12. Apparatus for forming a group of bottles containing a predetermined number of said bottles and placing said group into a compartmented case having an open base, comprising, in combination, means for feeding a single row of bottles, means for forming said row of bottles into a plurality of rows, a stop, means for feeding the plurality of rows so that the leading bottle of each row engages said stop thus producing a group of bottles containing a predetermined number of bottles in each row at a location near the terminal end of said bottle feeding means, means for feeding empty cases one by one into a position laterally contiguous to said location with the top of each case below the base of said group of bottles at said location, a bridging member movable in a substantially horizontal plane the same as that in which the base of the bottles rests over an empty case in said position, means for moving said bridging member over the mouth of an empty case, means for moving a group of bottles from said location on to said bridging member, means concurrently operable with said last-mentioned means for preventing the feed of additional bottles into said location while the aforesaid group of bottles is moved onto said bridging member, vertically reciprocable bottle supporting fingers one for each bottle of said group movable through the base of the empty case into engagement with the base of said bottles of said group to elevate them above said bridging member, means for retracting the bridging member from above the mouth of the empty case leaving the group of bottles supported on said bottle supporting fingers, means for lowering said fingers to place the bottles in the case with one bottle in each compartment, and means for removing the filled case.

13. A bottle handling machine comprising, in combination, a first bottle conveyor; a second and third bottle conveyor disposed on opposite sides of the first bottle conveyor parallel and contiguous thereto with the bottle carrying passes of said conveyors all disposed in substantially the same horizontal plane; a transfer mechanism, comprising a pair of rotating shafts each having mounted thereon for rotation therewith a series of three bottle engaging rolls, the rolls of one shaft rotating in opposite direction from the rolls on the other shaft, and the rolls of each shaft being spaced approximately 120° apart with the rolls on both rotating shafts so disposed relative to each other that alternate bottles on the first conveyor are caused to move from the first conveyor on to the second and third conveyors respectively, arcuate rotatable members disposed contiguous to the second and third conveyors for engaging every third bottle thereon and moving the same on to the first conveyor thus producing three parallel rows of bottles on the three conveyors; stop mechanisms near the terminal ends of said conveyors against which the leading bottles of said three parallel rows of bottles are brought into contact; a case conveyor for moving empty cases below the level of said first mentioned conveyors; stop mechanism for stopping a case on said case conveyor so that an empty case is positioned laterally contiguous to and below the said group of bottles with the open mouth of the case below the level of the base of said bottles; horizontally reciprocable arms positioned on the side of the case conveyor opposite to that from which the said group of bottles is located; means for moving said arms from a position bridging the mouth of an empty case to support the said group of bottles above the case to a position in which the arms are disposed to one side of said case; vertically reciprocable bottle supporting fingers disposed beneath the empty case when in bottle receiving position movable therethrough into engagement with the base of the bottles while supported on said arms, and means for moving said fingers to engage said bottles and elevate the same above said arms and also in a downward direction to move said bottles into said case with one bottle in each compartment of said case.

14. A bottle handling machine comprising, in combination, a first bottle conveyor; a second and third bottle conveyor disposed on opposite sides of the first bottle conveyor parallel and contiguous thereto with the bottle carrying passes of said conveyors all disposed in substantially the same horizontal plane; a transfer mechanism comprising a pair of rotating shafts each having mounted thereon for rotation therewith a series of three bottle engaging rolls, the rolls of one shaft rotating in opposite direction from the rolls on the other shaft, and the rolls of each shaft being spaced approximately 120° apart with the rolls on both rotating shafts so disposed relative to each other that alternate bottles on the first conveyor are caused to move from the first conveyor on to the second and third conveyors respectively, arcuate rotatable members disposed contiguous to the sides of the second and third conveyors for engaging every third bottle thereon and moving the same on to the first conveyor thus producing three parallel rows of bottles on the three conveyors; stop mechanisms near the terminal ends of said conveyors against which the leading bottles of said three parallel rows of bottles are brought into abutment; a group station contiguous to said stop for receiving three rows of said bottles each row containing four bottles; a case conveyor for moving empty cases below the level of said conveyors; stop mechanism for stopping an empty case is positioned laterally contiguous to and below the said group station with the open mouth of the case below the level of the base of said bottles in said group station; horizontally reciprocable arms positioned on the side of the case conveyor opposite to that at which the said group station is located; means for moving said arms into a position bridging the mouth of the stopped empty case to support the said group of bottles above said case and for returning said arms to a position in which the arms are disposed to one side of said case; a pusher bar for moving a group of twelve bottles on to said arms over the empty case; a stop member movable across the said first mentioned conveyors for preventing movement of bottles into said group station while the group of bottles in said group station are moved onto said arms; twelve vertically reciprocable bottle supporting fingers arranged in three rows each containing four fingers disposed beneath the empty case movable therethrough into engagement with the base of the bottles while supported on said arms; and means for moving said fingers upwardly to engage said bottles in said group and elevate the same above said arms and also downwardly to move said bottles into said case with one bottle in each compartment of said case.

15. A bottle handling machine comprising, in combination, conveying means for producing in a group station a group of bottles constituted of a plurality of rows of bottles with the bottles of each row in substantially abutting relation; a first case retaining means on one side of said group station for maintaining an empty case in position to receive a group of bottles with the mouth of said case disposed below the said group station; a second case retaining means disposed on the other side of said group station for maintaining an empty case with the mouth of said case disposed below said group station; two horizontally reciprocable bridging members, one movable back and forth above the mouth of an empty case in the first case retaining means to bridge the space above said mouth to receive a group of bottles from said group station and support the bottles thus received above the said empty case and the other movable back and forth above the mouth of an empty case in the second case retaining means to bridge the space above said mouth to receive another group of bottles from said group station and support the bottles thus received above the empty case in said second case retaining means; a single reciprocable pusher member for moving in one direction of its reciprocation one group of bottles from said group station on to one of said bridging members and in its other direction of its reciprocation for moving the next group of bottles formed in said group station on to the other of said bridging members; two sets of vertically reciprocable bottle supporting fingers, one set movable through the base of one case in said first case retaining means into engagement with the group of bottles on the bridging member thereabove and the other set movable through the base of another case in said second case retaining means into engagement with the group of bottles on the bridging member thereabove; and means for moving each set of said fingers into engagement with the group of bottles thereabove and to lower said group of bottles into the case through which said fingers move.

16. Article handling apparatus comprising, in combination, a case support, bridging means horizontally reciprocable from a first position to one side of said case support to a second position above a case on said case support, and article supporting fingers vertically reciprocable from a first position below said case through said case to a second position to support articles on said bridging means and back to said first position below said case.

17. In an apparatus for loading containers into a packing case, means to support said case, a horizontal plate carrying a plurality of spaced horizontal tines movable between a position over said case and a position to one side of said case, means whereby a group of containers is arrayed on said tines when over said case on said support, means comprising a plurality of upstanding rods passing through apertures in the bottom of said case, between said tines and contacting the bottoms of said containers, means to withdraw said tines from over said case to said second named position, and means to lower said rods and thus lower said containers into said case.

18. Container handling apparatus comprising, in combination, a case support, horizontally reciprocable spaced arms movable from a first position to one side of said case support to a second position above a case on said support and bridging the space above the open top of said case, and vertically reciprocable container supporting fingers located below said case support and movable up through a case on said case support to an elevated position in which the tips of said fingers pass through the spaces between said arms and back to the original position in which the tips of said fingers are disposed below the base of a case on said case support.

19. Article handling apparatus comprising in combination, a supporting frame, a case support on said frame, a bridging means horizontally reciprocable from a first position to one side of said case support to a second position above a case on said case support, article supporting fingers vertically reciprocable from a first position below said case to a second position through said case to support articles on said bridging means and back to said first position below said case, and means for so moving said article supporting fingers comprising a rack, a pinion meshing with said rack and means on the top of said frame for driving said pinion and thus effecting reciprocatory movement of said rack.

20. Article handling apparatus comprising in combination, a frame, a case support on said frame, horizontally reciprocably spaced arms movable from a first position to one side of said case support to a second position above a case on said support and bridging the space above the open top of said case, vertically reciprocable article supporting fingers located below said case support and movable up through a case on said case support to an elevated position in which the tips of said fingers pass through the spaces between said arms and back to the original position in which the tips of said fingers are disposed below the base of a case on said case support, a horizontally reciprocating pusher for moving articles onto said spaced arms when said arms are in said position bridging the space above the open top of a case, a fluid pressure cylinder mounted on the top of said frame for effecting movements of said pusher, a rack for effecting said vertically reciprocable movement of said fingers, a pinion meshing with said rack, and means actuated by said fluid pressure cylinder for rotating said pinion to reciprocate said rack and said fingers.

References Cited in the file of this patent

UNITED STATES PATENTS

| | | |
|---|---|---|
| 1,592,793 | Webster | July 13, 1926 |
| 2,024,503 | Bickford | Dec. 17, 1935 |
| 2,652,180 | Fox | Sept. 15, 1953 |